(12) United States Patent
Weinstein et al.

(10) Patent No.: US 7,710,745 B2
(45) Date of Patent: May 4, 2010

(54) BIPOLAR POWER SUPPLY SYSTEM

(75) Inventors: Eliahu Weinstein, San Diego, CA (US);
Kenneth E. Wing, Alpine, CA (US)

(73) Assignee: LHV Power Corporation, Santee, CA (US)

( * ) Notice: Subject to any disclaimer, the term of this patent is extended or adjusted under 35 U.S.C. 154(b) by 386 days.

(21) Appl. No.: 11/659,545

(22) PCT Filed: Aug. 4, 2005

(86) PCT No.: PCT/US2005/027674
§ 371 (c)(1),
(2), (4) Date: Feb. 6, 2007

(87) PCT Pub. No.: WO2006/017631
PCT Pub. Date: Feb. 16, 2006

(65) Prior Publication Data
US 2008/0074904 A1    Mar. 27, 2008

(51) Int. Cl.
*H02M 7/42* (2006.01)
*H02M 7/53* (2006.01)
*H02M 7/523* (2006.01)
*H02M 7/529* (2006.01)

(52) U.S. Cl. .................. 363/21.01; 363/21.17; 363/63; 363/65

(58) Field of Classification Search .......... 363/19, 363/21.12, 61, 65, 20, 21.01, 21.09, 21.17, 363/40, 63, 97
See application file for complete search history.

(56) References Cited
U.S. PATENT DOCUMENTS

| | | | | |
|---|---|---|---|---|
| 4,737,897 A | * | 4/1988 | Shipley et al. ................. | 363/19 |
| 4,825,144 A | * | 4/1989 | Alberkrack et al. .......... | 323/272 |
| 6,194,881 B1 | * | 2/2001 | Parker et al. ................. | 323/237 |
| 6,295,216 B1 | * | 9/2001 | Faria et al. .................... | 363/44 |
| 7,342,136 B2 | * | 3/2008 | Kenneally et al. ........... | 564/481 |
| 7,342,436 B2 | * | 3/2008 | Tsuchiya et al. ............ | 327/536 |

OTHER PUBLICATIONS

BiCMOS Analog Circuit Techniques, Bruce A. Wooley, Circuits and Systems, 1990., IEEE International Symposium on May 1-3, 1990-1986 vol. 3 (pp. 1-2 and 4), Digital Object Identifier 10.1109/ISCAS.1990, 112114.*

(Continued)

*Primary Examiner*—Gary L Laxton
*Assistant Examiner*—Nusrat J Quddus
(74) *Attorney, Agent, or Firm*—Richard D. Clarke

(57) ABSTRACT

The present invention is directed to a remotely controlled power supply system that can change output polarity at a high slew rate without using switching devices. The system comprises a control circuit and two individual high voltage DC-DC converter power supply sections, one positive and one negative, connected in series. By nature of the control circuitry, either a positive or negative controllable current is produced depending upon a programmed voltage input. The two individual power supply sections are each self-oscillating single transistor circuits. The self-oscillating circuits contain an RC network tuned to provide attenuation at the second harmonic of the natural oscillating frequency of the circuit. This reduces and/or eliminates the tendency of this circuit to begin oscillation at the wrong harmonic of the natural frequency. A power-on delay circuit is used to suppress the outputs of the two power supply sections no matter the command of the input control programming signal. An enable signal input allows for suppression of the power supply system output at any other time.

17 Claims, 8 Drawing Sheets

OTHER PUBLICATIONS

An Analogue Frequency—Division Approach for Subharmonic Generation in Microwave VCOs, Xiandong Zhang and Iam Gresham, Microwave Symposium Digest, 1998 IEEE MTT-S International vol. 3 Jun. 7-12, 1998 pp. 1581-1584 vol. 3 (See, p. 1581, col. 1 Para3 L1-col. 2 Para1 L2).*

* cited by examiner

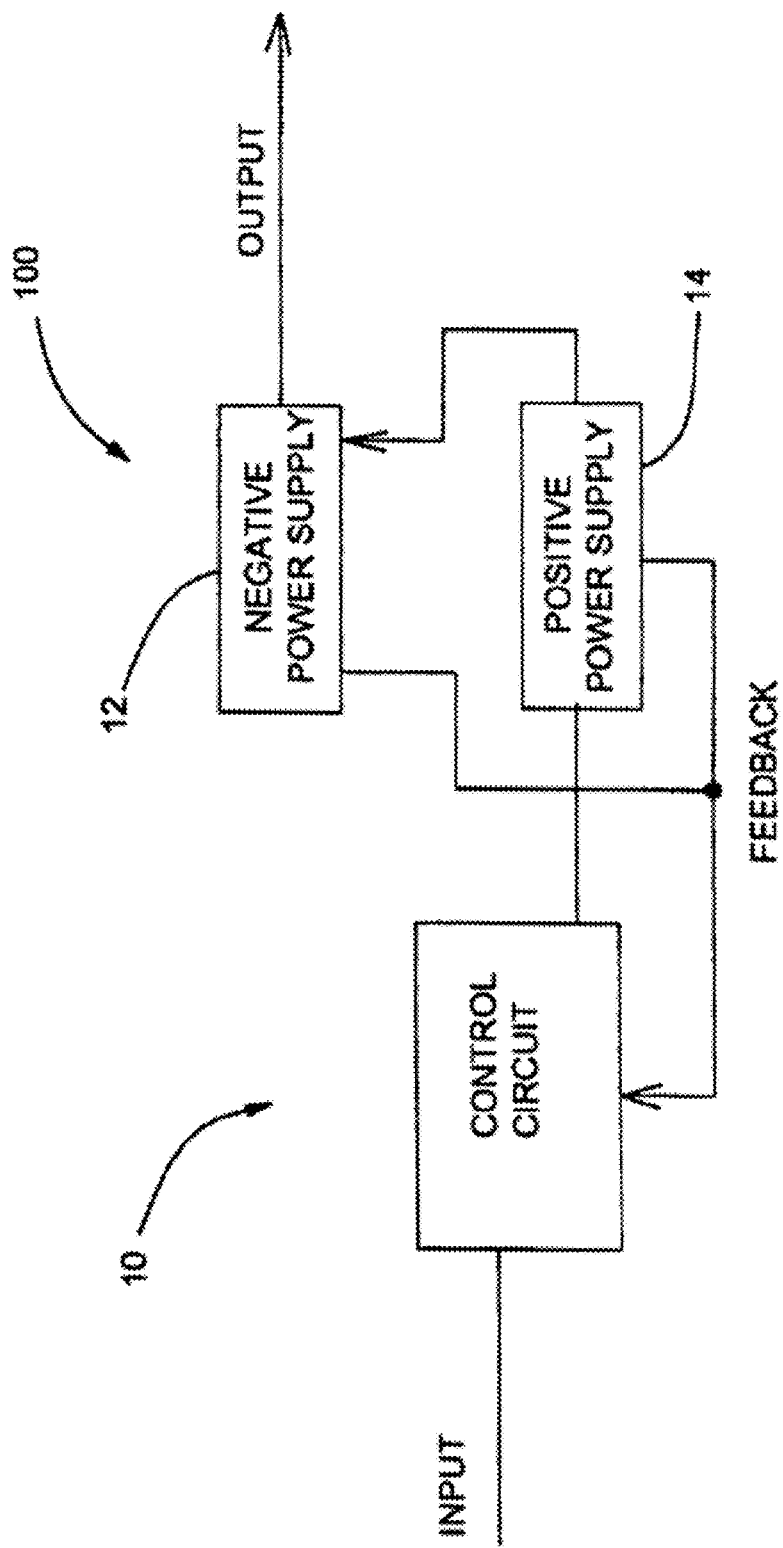

BIPOLAR POWER SUPPLY SYSTEM

TECHNICAL FIELD

This invention relates generally to power supplies, and more particularly to a bipolar power supply system that is structured to change its output polarity at a high slew rate without the aid of a mechanical switching device.

BACKGROUND ART

Switching power supplies are used in many electronic systems of varying applications, including telecommunications, networking, test and measurement, and imaging. These power supplies can convert unregulated input into direct current (DC) power at predetermined voltage and power levels and provide a load with either a positive or negative voltage. Switching power supplies typically provide power through low loss components such as capacitors, inductors, and transformers, and by the use of transistors operating in either the cutoff state, where there is a high voltage across the pass unit but no current flow, or the saturation state, where there is a high current through the pass unit but at a very small voltage drop. The transistors essentially create an alternating current (AC) voltage from an input DC voltage. This AC voltage can then be stepped-up or down by transformers and then filtered back to DC voltage at the output.

Early high voltage switching power supplies required the user to manually switch output polarity. To do so, the user had to reconfigure the high voltage circuits by physically disconnecting and connecting key electrical nodes. This practice was unsafe in that it required the user to be exposed to energized high voltage circuits. Another disadvantage to using these power supplies was the significant time required for the user to manually change the output polarity.

Improved high voltage switching power supplies utilized mechanical means to change polarity instead of the manual switching procedure. As an example, new circuitry included control circuits, driver circuits, low voltage relays, high voltage relays, and transformers. Relay control logic was used to control the switching of the relays to produce either a negative or positive polarity. While these more advanced power supplies eliminated the danger of manual switching, the cost of the power supplies increased due to expensive relays. Additionally, even with mechanical switching means, the rate of output polarity change still did not occur at a very high rate. To illustrate, a circuit using high voltage relays generally requires tens to hundreds of milliseconds to switch. Thus, it would take a significant amount of time to warm-up devices that rely upon rapid output polarity change to heat a tube or a lamp used as a heating apparatus. There is also a limited voltage output range available as a result of the constraint in switching speed. For this reason, switching power supplies are commonly used for fixed output or limited adjustment range output designs. It is important for a power supply to be programmable for a wide range of output currents to satisfy the complex and varying needs of today's highly-sophisticated technological devices. A power supply using mechanical switching means does not meet this need.

An additional shortcoming of using mechanical switching means is in the production of bouncing and other undesired effects. A circuit that contains undesired effects is inefficient and can wear out its components after many cycles. This occurrence not only can lead to increased power supply costs for the consumer, but can also lead to the damage of any devices that are connected to the power supply.

A need therefore exists for a for a low power, high voltage power supply that is programmable for a wide range of output current, has the capability of either positive or negative current polarity output, does not use mechanical means for switching polarity, and can be commanded to systematically, efficiently, and effectively change polarity within a few milliseconds without undesired effects that can damage circuit components. Among others, devices that employ a lamp or tube as a heating source will greatly benefit from this type of power supply, as the warm-up time of the lamp or tube will essentially be eliminated.

DISCLOSURE OF INVENTION

It is a primary advantage of this invention to provide a remotely controlled power supply system that can change its output polarity at a high slew rate without the aid of mechanical switching devices.

Another advantage of this invention is that it provides a low power, high voltage bipolar power supply system that is programmable for output current.

Yet another advantage of this invention is that it provides a low power, high voltage power supply system that has the capability of either positive or negative current polarity output.

A further advantage of this invention is that it involves a bipolar power supply system that eliminates unstable oscillatory modes that produce unsatisfactory output and efficiencies, which can result in destruction of circuit components.

It is still another advantage of this invention is that provides a bipolar power supply system that does not generate an undefined output current during normal system initialization delays, preventing damage to the attached device.

It is yet another advantage of this invention to provide a bipolar power supply system with the capability of suppressing the output of the power supply at any time.

In one embodiment of the invention, a bipolar high voltage power supply system delivers a controlled output current. The power supply system includes a control circuit and two individual high voltage DC-DC converter power supply sections. The two individual high voltage DC-DC converter power supply sections are each self-oscillating single transistor circuits. Each power supply section includes a step-up transformer containing a primary winding, secondary winding, and feedback winding. Oscillator transistor collectors serve to drive the primary windings of each step-up transformer. The feedback winding is connected in an anti-phase manner with regards to the primary winding, setting up the self-oscillating characteristic of the circuit.

A resistor-capacitor (RC) network in the base biasing circuit of each self-oscillating circuit is tuned to provide attenuation at the second harmonic of the natural oscillating frequency of the circuit. This tuning serves to reduce and/or eliminate the tendency for the self-oscillating circuit to start oscillation at the wrong harmonic of the natural frequency. A DC bias current is applied to the base of each oscillator transistor via a resistor, diode, and capacitor network. By nature of the control circuitry, only one of the two power supply sections is in an active state at a time, so the output current is either positive or negative, depending on the programming voltage input to the operational amplifiers employed as frequency-compensated error amplifiers for each power supply section.

The control circuit contains an operational amplifier to convert the power supply system's output current into a feedback voltage that can be applied to the error amplifiers in each power supply section. The active power supply section's high voltage output returns to the power supply via ground. This return current flows at the output of the control circuit's operational amplifier thru its feedback resistor and by the nature of the operational amplifier, generates a voltage drop across the feedback resistor that is equal to the reference voltage on the non-inverting input of 1.6V and is applied from the operational amplifier output to its inverting input. The control circuit's operational amplifier's output voltage will change appropriately from zero V to 3.2V to maintain this voltage drop across the feedback resistor. This output voltage is then used as the reference input voltage to the error amplifiers of the two individual high voltage DC-DC converter power supply sections in the following manner:

a. If the power supply system's programming voltage is equal to the control circuit's operational amplifier's reference voltage of 1.6V, both power supply sections are inactive and the power supply system output current is zero.

b. If the power supply system's programming voltage is above 1.6V up to a maximum of 3.2V, the positive polarity high voltage power supply is commanded to active state by its error amplifier, and the output current from the power supply system is positive polarity.

c. If the power supply system's programming voltage is below 1.6V down to zero V, the negative polarity high voltage power supply is commanded to active state by its error amplifier, and the output current from the power supply system is negative polarity.

d. The greater the difference of the power supply system's programming voltage input is from the reference voltage of 1.6V, either towards 0V or 3.2V, the greater the amplitude of the output current, either negative or positive respectively. The amplitude of the power supply system's output current is indirectly proportional to the value of the feedback resistor.

The present invention also concerns an improvement to a self-oscillating power supply, the improvement comprising the inclusion of a network that is electrically connected to a transformer and to an active element in the power supply, wherein the network filters out the harmonics of the second and higher order.

The present invention is further concerned with a printer, particularly a laser color printer, comprising the above described bipolar power supply.

BRIEF DESCRIPTION OF DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 1 depicts a generalized block diagram of a bipolar power supply system according to one embodiment of the invention.

For a fuller understanding of the nature and objects of the invention, reference should be given to the following detailed description taken in conjunction with the accompanying drawings, which are incorporated in and form a part of this specification and illustrate embodiments of the invention, and together with the description, serve to explain the principles of the invention.

BEST MODE FOR CARRYING OUT THE INVENTION

A detailed description of an embodiment of the invention is provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Referring now to FIG. 1, there is shown a generalized block diagram of the bipolar controlled output power supply system. This figure illustrates an input into the control circuit 10, the output of which flows into either the negative polarity high voltage power supply 12 or the positive polarity high voltage power supply 14. The negative polarity high voltage power supply 12 and the positive polarity high voltage power supply 14 are connected in series. A final output from either the negative polarity high voltage power supply 12 or the positive polarity high voltage power supply 14 is transferred to the end device. The positive polarity high voltage power supply 12 contains a feedback loop that is directed back to the control circuit 10.

Figure 2A:
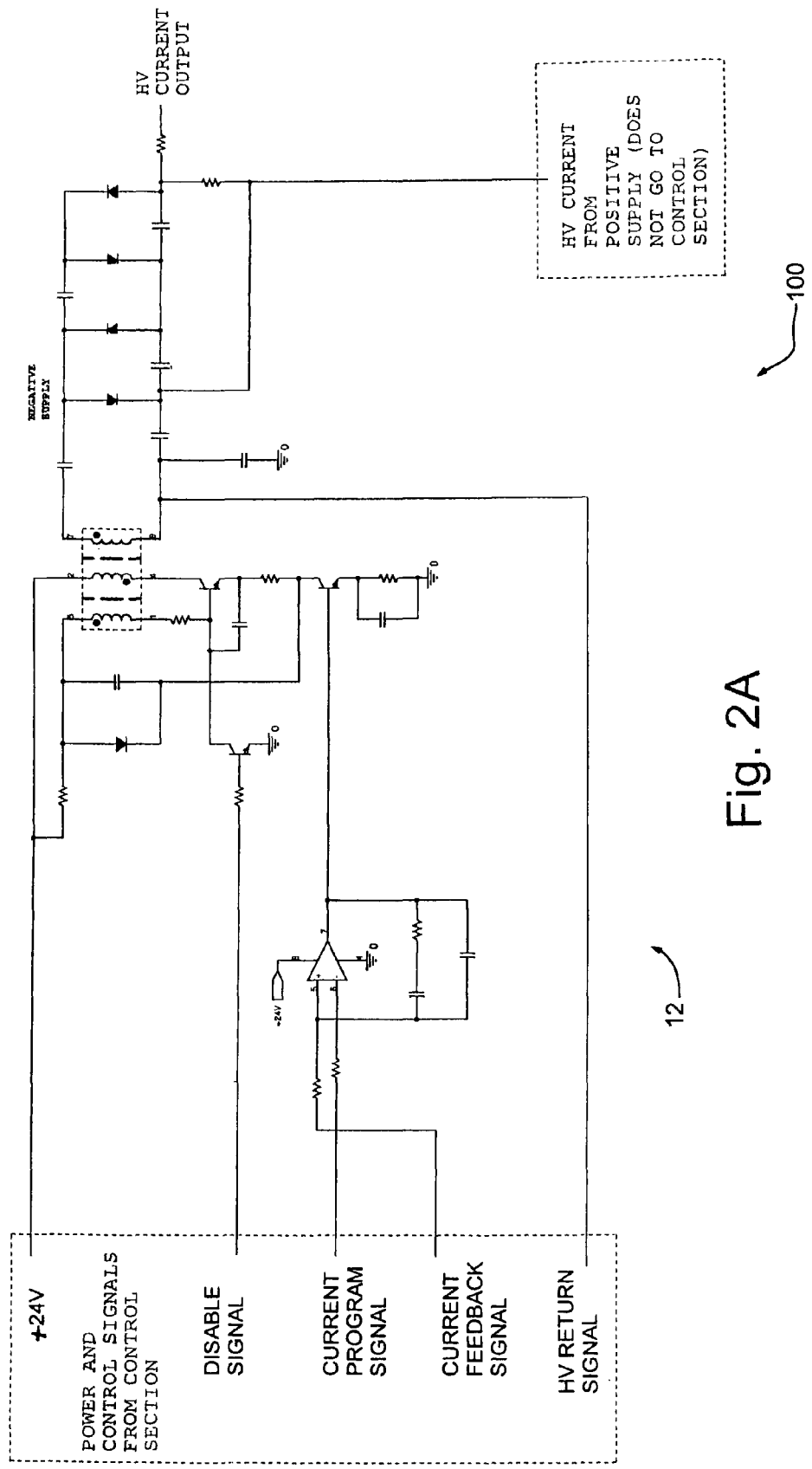
FIGS. 2A, 2B and 2C depict schematic diagrams for the bipolar power supply system of FIG. 1.
Figure 2B:
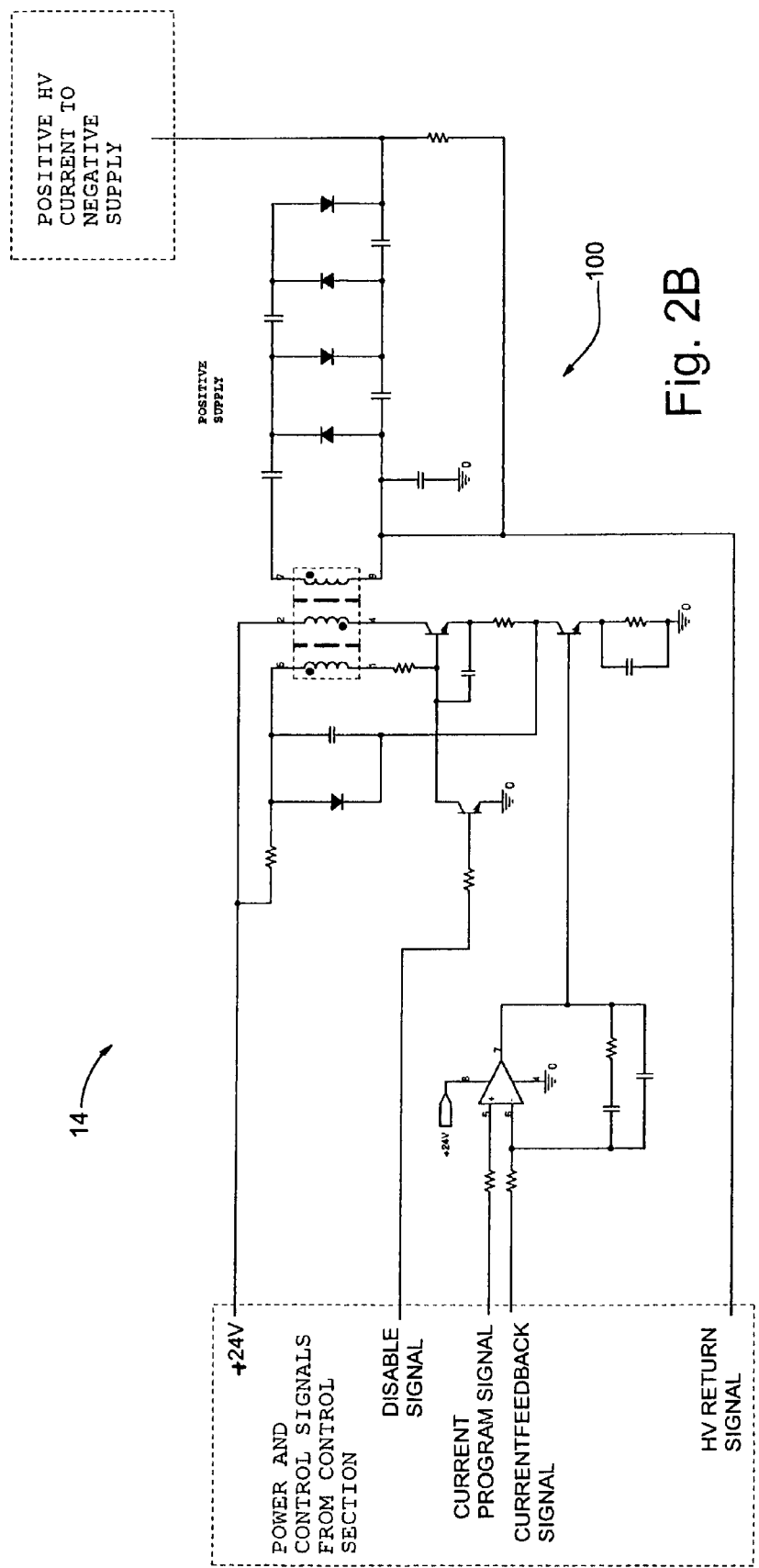
Figure 2C:
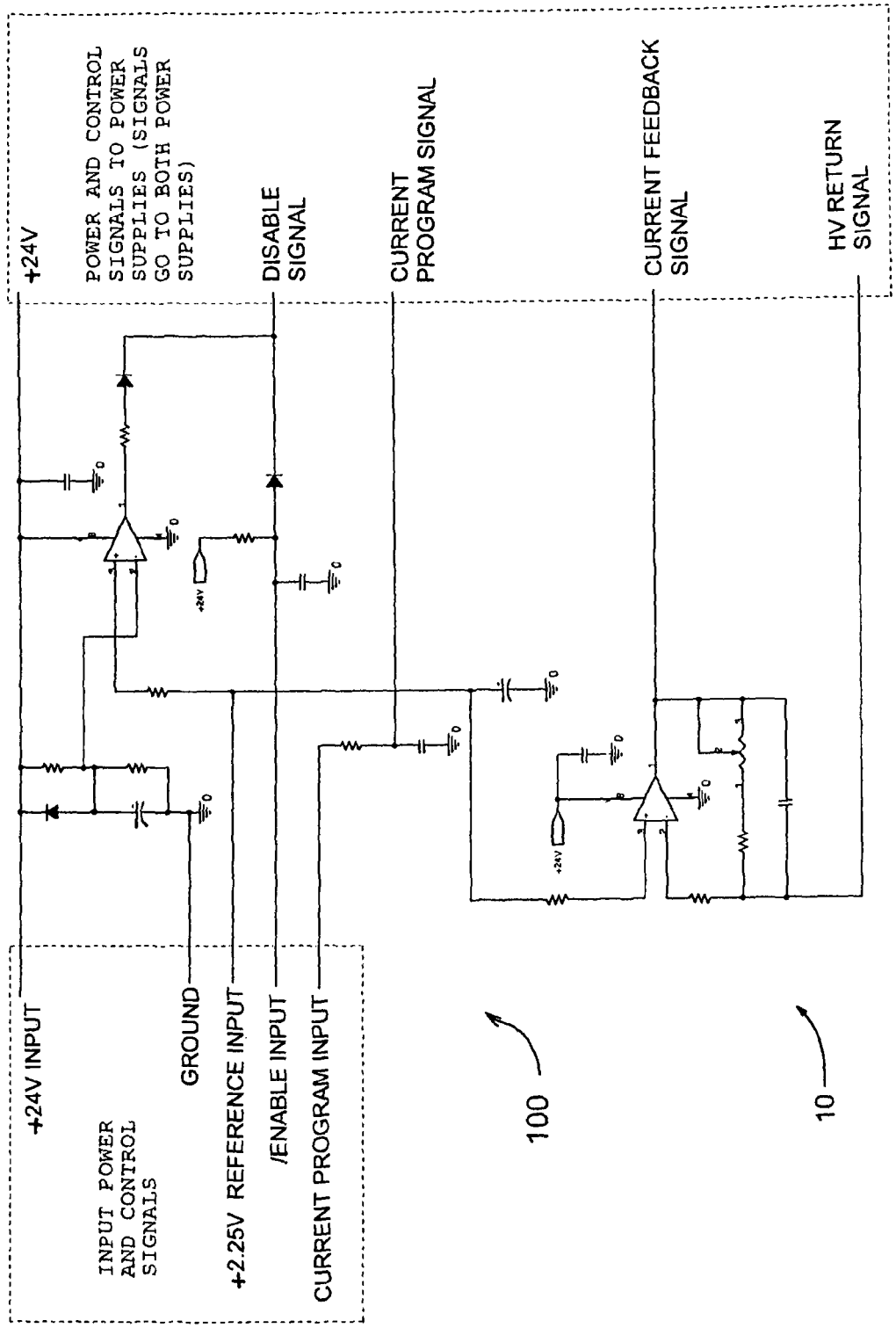

Referring now to FIGS. 2A, 2B and 2C there is depicted three schematics for the bipolar controlled output power supply system. These figures illustrate circuitry orientation for the control circuit 10 in FIG. 2A, the negative polarity high voltage power supply 12 in FIG. 2B, and the positive polarity high voltage power supply 14 in FIG. 2C.

Figure 3:
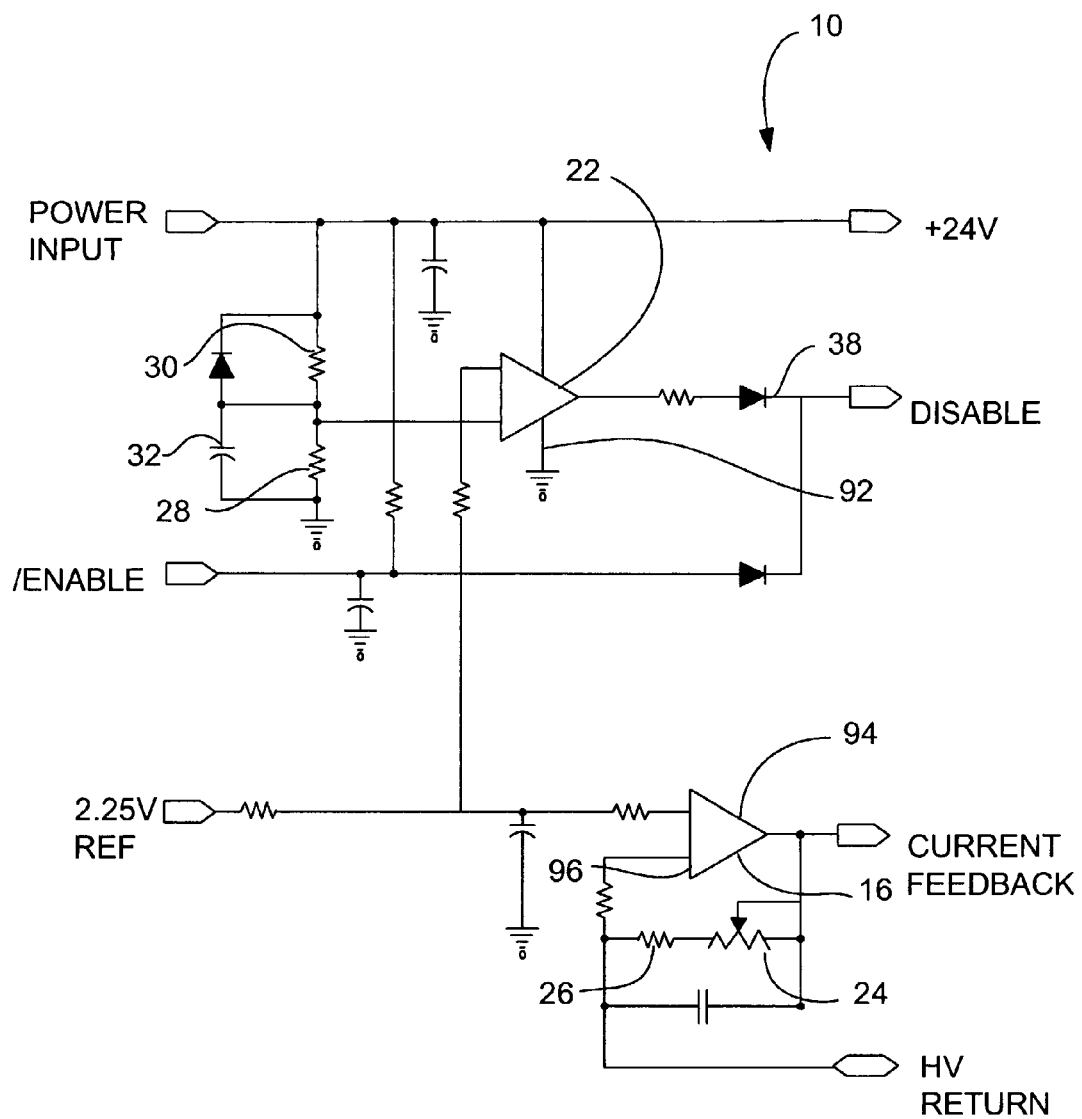
FIG. 3 depicts a schematic diagram for the control circuitry block of the bipolar power supply system of FIG. 2.

Referring now to FIG. 3, there is depicted a schematic for the control circuit 10. A 24V DC power input provides power to all sections of the system. Operational amplifier 16 serves to convert the power supply's output current into a feedback voltage that can be applied to error amplifier 18, shown in FIG. 4, for the negative polarity high voltage power supply 12, and error amplifier 20, shown in FIG. 5, for the positive polarity high voltage power supply 14. This feedback voltage is applied to the appropriate inputs of error amplifiers 18 and 20. The active power supply section's high voltage output returns to the power supply via "ground", the Vee pin 92 of operational amplifier 22. This return current flows at the output of operational amplifier 16 through feedback resistor 24 and feedback resistor 26, in series combination for this implementation.

By the nature of operational amplifier 16, a voltage drop is generated across feedback resistor 24 and feedback resistor 26, which is applied from the output 94 of operational amplifier 16 to the inverting input 96 of operational amplifier 16. The voltage drop is determined according to the reference voltage on the non-inverting input of operational amplifier 16 of 1.6V. The output voltage of operational amplifier 16 will change appropriately from zero V to 3.2V to maintain this voltage drop across resistors 24 and 26. This output voltage of operational amplifier 16 is then used as the reference input voltage to error amplifier 18 for the negative polarity high voltage power supply 12 and error amplifier 20 for the positive polarity high voltage power supply 14 in the following manner:

a. If the power supply system's programming voltage is equal to operational amplifier 16 reference voltage of 1.6V, both the negative polarity high voltage power supply 12 and the positive polarity high voltage power supply 14 are inactive and the power supply system output current is zero.

b. If the power supply system's programming voltage is above 1.6V up to a maximum of 3.2V, the positive polarity high voltage power supply 14 is commanded to active state by error amplifier 20 and the output current of the power supply system is positive polarity.

c. If the power supply system's programming voltage is below 1.6V down to zero V, the negative polarity high voltage power supply 12 is commanded to active state by error amplifier 18 and the output current of the power supply system is negative polarity.

d. The greater the difference the power supply system's programming voltage input is from the reference voltage of 1.6V, either towards zero V or 3.2V, the greater the amplitude of the output current, either negative or positive. The amplitude of the power supply system's output current is indirectly proportional to the value of resistors 24 and 26.

Thus, the power supply system's output current polarity is changed by varying the programming voltage above and below the internal reference voltage of 1.6V. The speed at which this is accomplished is only dependent upon the internal delays of the control circuit 10 and the negative polarity high voltage power supply 12 and positive polarity high voltage power supply 14, which are kept at a ready state. These delays have been characterized on the order of a few milliseconds (less than ten). By the nature of the control circuit 10, either the negative polarity high voltage power supply 12 or the positive polarity high voltage power supply 14 is in an active state at a time, so the power supply system's output current is either positive or negative depending on the programming voltage input to error amplifiers 18 and 20.

Power-on delay circuitry was devised using operational amplifier 22, such that the outputs of the negative polarity high voltage power supply 12 or the positive polarity high voltage power supply 14 are suppressed no matter what the input control programming signals command. This suppression is timed to last for approximately fifty milliseconds, giving the system time to initialize and produce a known and expected programming signal. This circuitry involves timing circuits comprised of resistor 28, resistor 30, and capacitor 32, operational amplifier 22, and transistor 34 and oscillator transistor 98, shown in FIG. 4, disabling the two power supply sections 12 and 14.

Another need was for the system to be able to suppress the output of the power supply at any time. To achieve this result, an enable signal input was fashioned to produce the same effect as the above initial output suppression. This input occurs via blocking diode 38 to transistor 34 and oscillator transistor 98.

Figure 4:
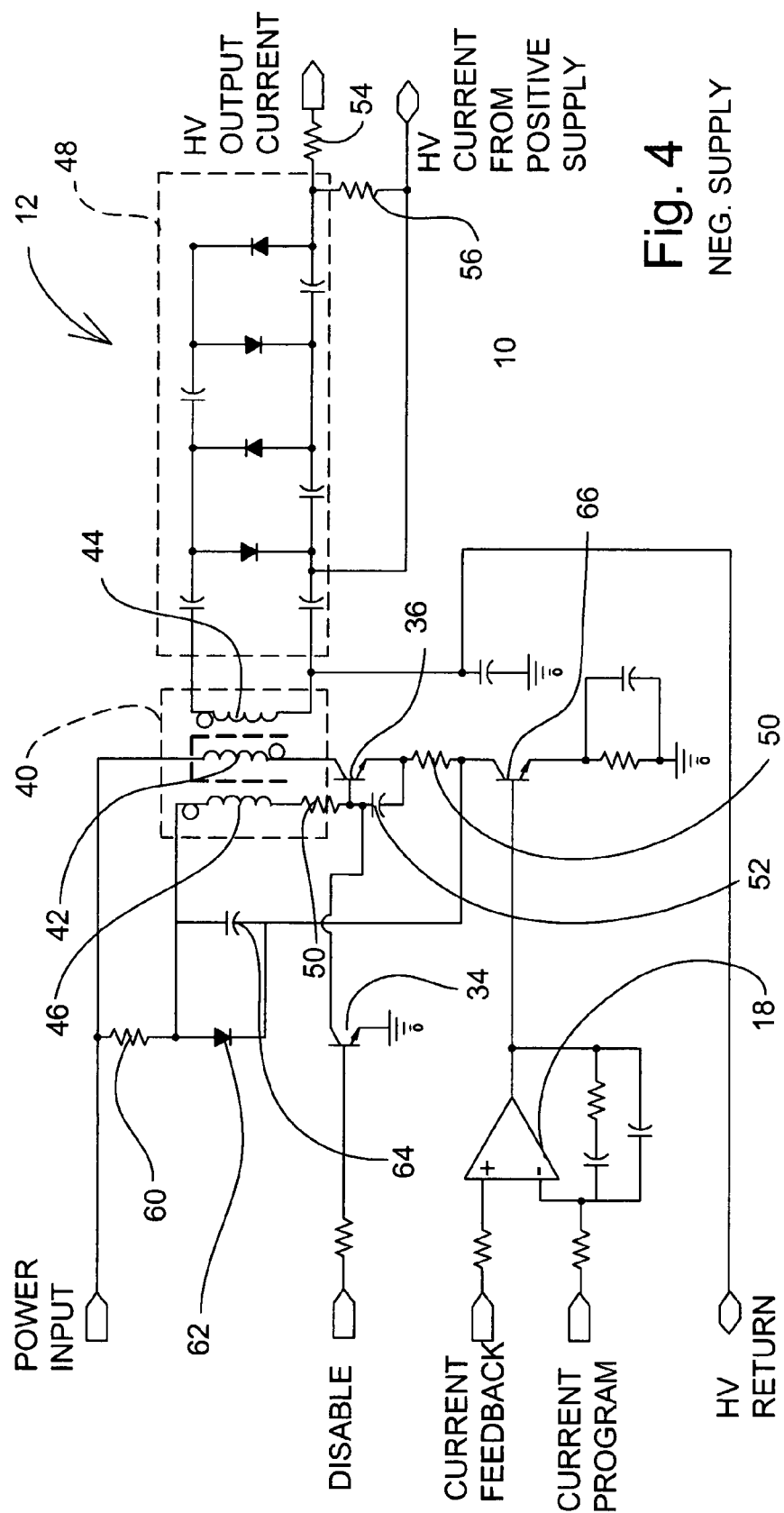
FIG. 4 depicts a schematic diagram for the negative polarity high voltage power supply block of the bipolar power supply system of FIG. 2.

Referring now to FIG. 4, there is shown a schematic for the negative polarity high voltage power supply 12. As illustrated, a step-up transformer 40 consists of a primary winding 42, a secondary winding 44, and a feedback winding 46. The collector of oscillator transistor 36 serves to drive the primary winding 42. Secondary winding 44 drives the respective multiplier circuit 48 to obtain the correct output voltages. The feedback winding 46 is connected in an anti-phase manner with regards to the primary winding 42, thus setting up the self-oscillating characteristic of the circuit.

Operational amplifier 18 is the error amplifier controlling negative polarity high voltage power supply 12. Power supply programming voltage is applied to the inverting input of operational amplifier 18, which then adjusts its output to create a voltage input to its non-inverting input (output current control feedback signal generated by operational amplifier 16), thus creating system balance and output current regulation when this high voltage power supply is active.

A base biasing circuit comprised of resistor 50 and capacitor 52 is tuned to provide a filtering effect by attenuating the harmonics of the second order and higher of the natural of the self-oscillating circuit. This tuning serves to reduce and/or eliminate the tendency for this type of circuit to start oscillation at the wrong harmonic of the natural frequency, and to keep the oscillator on the correct mode, because unstable oscillatory modes cause unsatisfactory output and efficiencies, and can result in the destruction of circuit components. Further, such a base biasing circuit provides an additional phase shift to the AC feedback signal as applied to the base of oscillating transistor 36.

Figure 6:
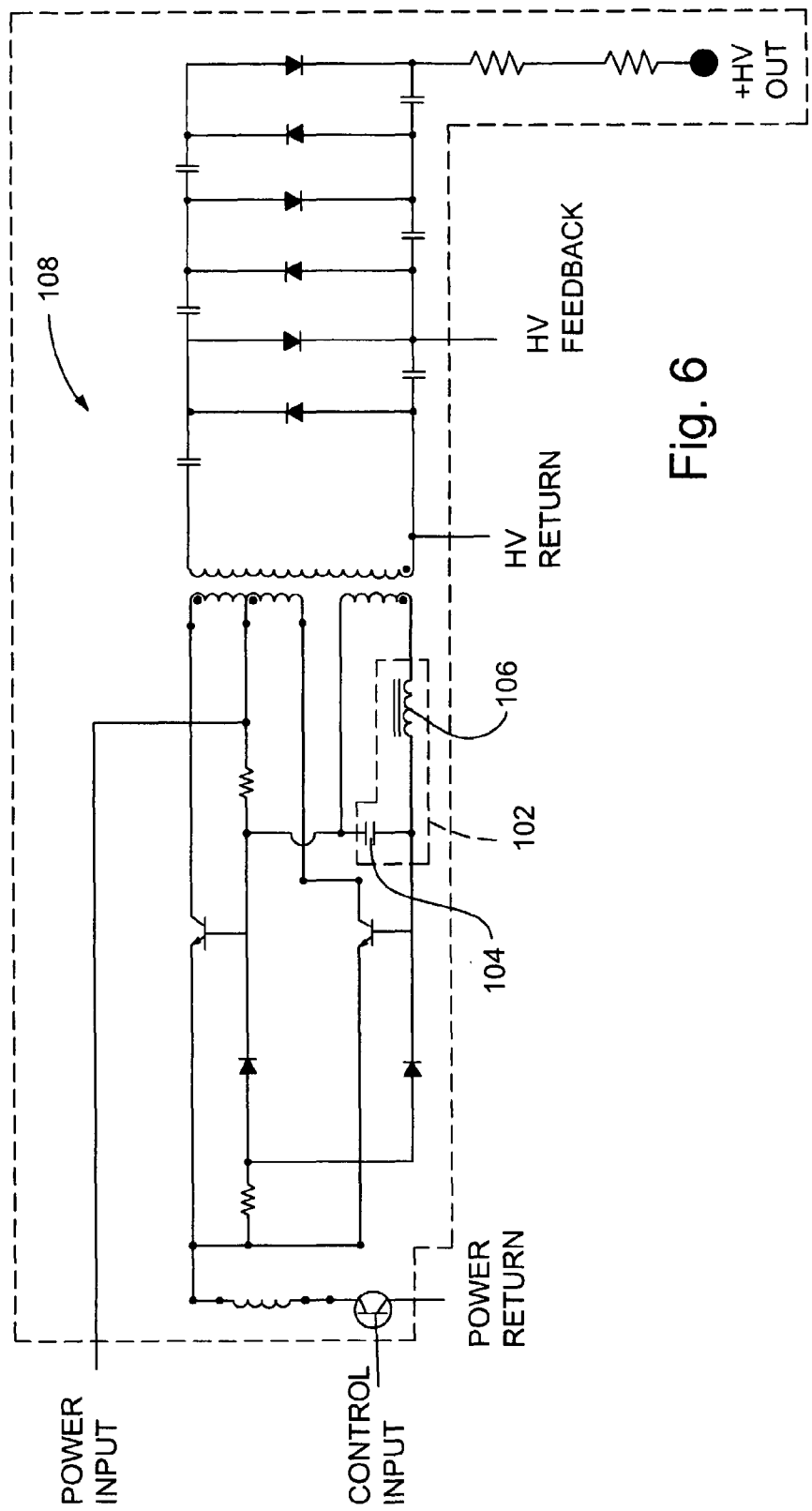
FIG. 6 depicts a schematic wherein a base-biasing circuit is employed within an example self-oscillating power supply.

It should be noted that the application of the above-described base biasing circuit can extend beyond the specific embodiment described herein, and can be employed in other types of self-oscillating power supplies. In general, a network of this type comprises a capacitor and an impedance element, such as an inductor or a resistor, and may be used in any self-oscillating circuit that comprises a transformer electrically connected to an active element, such as a transistor. One example of this type of network is shown in FIG. 6, wherein a network 102 comprising a capacitor 104 and an inductor 106 is employed in a Royer-type circuit 108.

The main benefit provided by this type of network is to filter out—therefore, to attenuate or substantially eliminate—the harmonics of the second order and higher, thereby accentuating the natural frequency of the power supply and causing the oscillation to set in and operate at that natural frequency. This is especially relevant in high voltage (more than 60V), low power applications that supply output currents to electrostatic devices, including electrostatic air cleaners, electrostatic sprayers, photo multipliers, and deflection circuits.

High voltage current output is taken from the multiplier circuit 48 of the negative polarity high voltage power supply 12, via resistor 54, which serves as a protective current limiting resistor.

A resistor 56 is connected across the multiplier circuit 48 to convert the voltage-source output of negative polarity high voltage power supply 12 into a current-source output. Resistor 56 is connected in series with resistor 58, shown in FIG. 5, of the positive polarity high voltage power supply 14 to provide current feedback to the control circuit 10 at operational amplifier 16.

A DC bias current is applied to the base of oscillator transistor 36 via a network comprising resistor 60, diode 62, and capacitor 64. Resistor 60 sets the current level and diode 62 limits the voltage to that appropriate for the base of oscillator transistor 36. Capacitor 64 serves as an AC return path for the oscillation feedback from the step-up transformer 40.

Output voltage regulation of negative polarity high voltage power supply 12 is implemented via a control element of a series pass transistor 66 in the emitter return of oscillator transistor 36. Operational amplifier 18 is employed as a frequency-compensated error amplifier driving series pass transistor 66.

Figure 5:
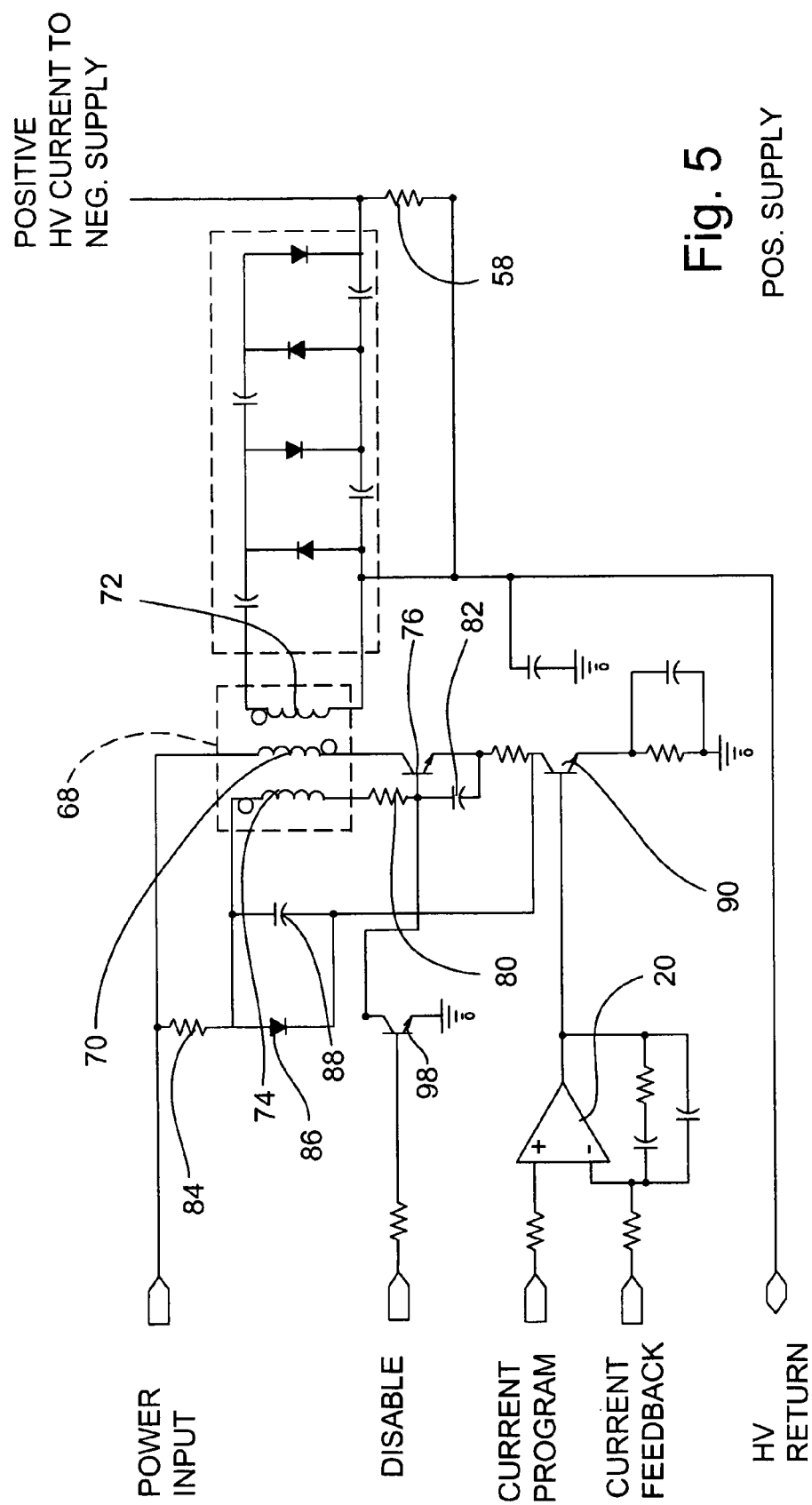
FIG. 5 depicts a schematic diagram for the positive polarity high voltage power supply block of the bipolar power supply system of FIG. 2.

Referring now to FIG. 5, there is shown a schematic for the positive polarity high voltage power supply 14. As illustrated, a step-up transformer 68 consists of a primary winding 70, a secondary winding 72, and a feedback winding 74. The collector of oscillator transistor 76 serves to drive primary winding 70. The secondary winding 72 drives multiplier circuit 78 to obtain the correct output voltage. Feedback winding 74 is connected in an anti-phase manner with regards to primary winding 70, thus setting up the self-oscillating characteristic of the circuit.

Operational amplifier 20 is the error amplifier controlling positive polarity high voltage power supply 14. Power supply programming voltage is applied to the non-inverting input of operational amplifier 20, which then adjusts its output to create a voltage input to its inverting input (output current control feedback signal generated by operational amplifier 16), thus creating system balance and output current regulation when this power supply section is active.

A base biasing circuit comprised of resistor 80 and capacitor 82 is tuned to provide attenuation at the second harmonic of the natural oscillating frequency of the self-oscillating circuit. This tuning serves to reduce and/or eliminate the tendency for this type of circuit to start oscillation at the wrong harmonic of the natural frequency. These other unstable oscillatory modes produce unsatisfactory output and efficiencies, and can result in destruction of the circuit components.

A DC bias current is applied to the base of oscillator transistor 76 via a network of resistor 84, diode 86, and capacitor 88. Resistor 84 sets the current level and diode 86 limits the voltage to that appropriate for the base. Capacitor 88 serves as an AC return path for the oscillation feedback from step-up transformer 68.

Resistor 58 is connected across multiplier circuit 78 to convert the voltage-source output of the power supply into a current-source output. Resistor 58 is connected in series with resistor 56 of the negative polarity high voltage power supply 12 to provide current feedback to the control circuit 10 at operational amplifier 16.

Output voltage regulation of positive polarity high voltage power supply 14 is implemented via a control element of a series pass transistor 90 in the emitter return of oscillator transistor 76. Operational amplifier 20 is employed as a frequency-compensated error amplifier driving series pass transistor 90.

Other implementations of the negative polarity high voltage power supply 12 and positive polarity high voltage power supply 14 circuits have been produced with an inductor substituted for resistors 50 and 80. This substitution produces higher efficiency and better control of oscillator mode stability, but does so at a higher component cost. Additionally, a sensing circuit or sensor component can be included in the feedback loop from the positive polarity high voltage power supply 14 to the control circuit 10. This addition can provide further efficiency to the operation of the power supply system.

The switching devices utilized in this invention may comprise any number of semiconductor switching devices suitable for switching the anticipated currents at the above described rate. Examples of such semiconductor switching devices include, but are not limited to, bi-polar transistors, insulated gate bi-polar transistors (IGBTs), field-effect transistors (FETs), metal-oxide semiconductor field-effect transistors (MOSFETs), etc., that are readily commercially available and well-known to persons having ordinary skill in the art.

Although these techniques and structures have been disclosed in the context of a certain embodiment and example, it will be understood by those skilled in the art that these techniques and structures may be extended beyond the specifically disclosed embodiment to other embodiments and/or uses and obvious modifications and equivalents thereof. Thus, it is intended that the scope of the structures and methods disclosed herein should not be limited by the particular disclosed embodiment described above.

INDUSTRIAL APPLICABILITY

The above described bipolar power supply system is particularly suitable for use in printers, particularly laser color printers, regardless of whether the printer transfers the image to a sheet of paper or other support by means of a drum or a by means of a belt. However, this invention can also be utilized in a variety of other applications, for instance, to energize electron-beam deflection circuits or mass spectroscopy instruments, and in other devices and systems as one skilled in the art would recognize, for example, electrostatic devices, including electrostatic air cleaners, electrostatic sprayers, photo multipliers, and deflection circuits.

What is claimed is:

1. A bipolar power supply system comprising:
a control circuit;
a negative power supply structured to provide an output current of negative polarity and electrically connected to said control circuit; and
a positive power supply structured to provide an output current of positive polarity and electrically connected to said control circuit,
wherein said negative and positive power supplies are connected in series,
wherein said control circuit provides a transition between said negative and positive power supplies that maintains only one of said negative and positive power supplies in an active state at a time and that causes said bipolar power supply system to provide an output current of only one of said negative and said positive polarity, and
wherein said transition between said negative and positive power supplies is caused by a programming voltage input provided by said control circuit to each of said negative and positive power supplies;
wherein said programming voltage input provided by said control circuit is created by an operational amplifier situated in said control circuit, said operational amplifier receiving a current feedback from said negative and positive power supplies;
wherein said programming voltage is provided to an error operational amplifier situated in each of said negative and positive power supplies,
wherein there is no output current from said bipolar power supply system when said programming voltage is a reference voltage,
wherein said positive power supply is in an active state when said programming voltage is higher than said reference voltage, and
wherein said negative power supply is in active state when said programming voltage is below said reference voltage; and
further wherein said programming voltage is applied to the inverting input of said error operational amplifier, and wherein said error operational amplifier adjusts its output to develop an error voltage input to the non-inverting input of said error operational amplifier, thereby creating a system balance and a regulation of said output current for that one of said negative and positive power supplies that is in an active state;
wherein said control circuit provides a transition between said negative and positive power supplies at a speed of less than ten milliseconds.

2. The bipolar power supply system according to claim 1, wherein said bipolar power supply system has an input current that is a direct current (DC), and wherein each of said negative and positive power supplies is a DC-DC converter.

3. The bipolar power supply system according to claim 2, wherein said DC converter is a self-oscillating circuit comprising a single oscillator transistor.

4. The bipolar power supply system according to claim 3, wherein each of said negative and positive power supplies provides an output voltage, wherein a protective current limiting resistor converts said output voltage to said output current.

5. The bipolar power supply system according to claim 4, wherein each of said negative and positive power supplies comprises a step-up transformer and an oscillator transistor, said step-up transformer comprising a primary winding and a secondary winding, said oscillator transistor comprising a base, an emitter, and a collector, wherein said collector is connected to said primary winding and drives current into said primary winding from an external source, and wherein said secondary winding is connected to a voltage multiplier circuit providing said output voltage at a desired level.

6. The bipolar power supply system according to claim 5, wherein said step-up transformer further comprises a feedback winding that provides alternating voltage and current to said base of said oscillator transistor, and wherein said feedback winding is connected in an anti-phase manner with respect to said primary winding, thereby providing said self-oscillating circuit with self-oscillating properties.

7. The bipolar power supply system according to claim 6, further comprising a filtering network that reduces harmonics of the second and higher orders, said filtering network being interposed between said feedback winding and said base of said oscillator transistor and comprising an impedance element, thereby causing said self-oscillating circuit to start-up and operate at its fundamental frequency.

8. The bipolar power supply system according to claim 7, wherein said filtering circuit comprises a resistor and a capacitor.

9. The bipolar power supply system according to claim 8, wherein said filtering circuit comprises an inductor and a capacitor.

10. The bipolar power supply system according to claim 5, further comprising a control element for regulating said output voltage of each of said negative and positive power supplies.

11. The bipolar power supply system according to claim 10, wherein said control element comprises a series pass transistor connected to said emitter of said oscillator transistor and an operational amplifier serving as a frequency-compensated error amplifier driving said series pass transistor.

12. The bipolar power supply system according to claim 1, wherein said reference voltage is 1.6V, wherein said positive power supply is in an active state when said programming voltage is comprised between more than 1.6V and 3.2V, and wherein said negative power supply in an active state when said programming voltage is comprised between more than zero V and less than 1.6V.

13. The bipolar power supply system according to claim 1, wherein the amplitude of said output current from said bipolar power supply system is directly proportional to the absolute value of the difference between said programming voltage and said reference voltage.

14. The bipolar power supply system according to claim 1, further comprising a power-on delay circuit suppressing the outputs of said negative and positive power supplies for a limited time period regardless of the value of said programming voltage, thereby providing said bipolar power supply system with sufficient time to initialize and to produce a programming signal of a predetermined nature.

15. The bipolar power supply system according to claim 14, wherein said limited time is approximately fifty milliseconds.

16. The bipolar power supply system according to claim 14, wherein said power-on delay circuit comprises a timing circuit having a resistor and a capacitor, and wherein said power-on delay circuit further comprises a first transistor disabling said negative power supply and a second transistor disabling the positive power supply.

17. The bipolar power supply system according to claim 1, further comprising an enable signal input capable of activating said power-on delay circuit at any time during operation of said bipolar power supply system, thereby enabling the suppression of said output current at any time during operation of said bipolar power supply system.

* * * * *